United States Patent [19]

Khouw et al.

[11] Patent Number: 5,160,706
[45] Date of Patent: Nov. 3, 1992

[54] PROCESS FOR THE CATALYTIC CRACKING OF A HYDROCARBON OIL

[75] Inventors: Frank H. H. Khouw; Marinus J. Spiessens; Martin J. P. C. Nieskens; Jouke J. Woudstra, all of The Hague, Netherlands

[73] Assignee: Shell Oil Company, Houston, Tex.

[21] Appl. No.: 710,471

[22] Filed: Jun. 5, 1991

Related U.S. Application Data

[63] Continuation of Ser. No. 604,856, Oct. 26, 1990.

[30] Foreign Application Priority Data

Oct. 17, 1989 [GB] United Kingdom ............... 8923345.6

[51] Int. Cl.$^5$ ............................................. B01J 8/22
[52] U.S. Cl. ......................... 422/140; 261/DIG. 75; 261/DIG. 76; 239/427.3; 422/145; 422/214
[58] Field of Search ............... 422/140, 144, 214, 224, 422/227, 145; 208/113, 153; 261/122, 124, DIG. 75, DIG. 76; 239/424.5, 427.3, 558

[56] References Cited

U.S. PATENT DOCUMENTS

| | | | |
|---|---|---|---|
| 3,246,960 | 4/1966 | Sharp et al. | 422/214 |
| 4,066,533 | 1/1978 | Myers et al. | 208/153 |
| 4,097,243 | 6/1978 | Bartholic | 23/288 |
| 4,134,734 | 1/1979 | Winter, III | 261/124 |
| 4,427,539 | 1/1984 | Busch et al. | 208/127 |
| 4,435,279 | 3/1984 | Busch et al. | 208/111 |
| 4,822,761 | 4/1989 | Walters et al. | 502/38 |
| 4,883,583 | 11/1989 | Mauleon et al. | 208/113 |
| 4,893,752 | 1/1990 | Spink et al. | 239/427.3 |

FOREIGN PATENT DOCUMENTS 241966 10/1987 European Pat. Off. .

Primary Examiner—Robert J. Warden
Assistant Examiner—Krisanne Thornton

[57] ABSTRACT

A device for introducing a hydrocarbon into a riser reactor containing a tubular diluent gas conduit having an interior surface and exterior wall surface where the interior wall surface is for passing a diluent gas into the reactor and two or more tubular hydrocarbon supply conduits, longitudinally perforated, arranged within the tubular diluent gas conduit where the longitudinal perforations are adapted to pass the diluent gas from the tubular diluent gas conduit into the tubular hydrocarbon supply conduit.

4 Claims, 2 Drawing Sheets

PROCESS FOR THE CATALYTIC CRACKING OF A HYDROCARBON OIL

This is a continuation of application Ser. No. 604,856, filed Oct. 26, 1990.

FIELD OF THE INVENTION

The present invention relates to a process for the catalytic cracking of a hydrocarbon oil.

SUMMARY OF THE INVENTION

A gas/hydrocarbon oil mixture is introduced into the reactor by means of at least one device which comprises at least one supply means of which the wall comprises openings, the hydrocarbon oil is introduced into the supply means and mixed with an at least partly surrounding gas which enters under pressure the supply means through the openings in the wall thereof.

In this way the hydrocarbon oil is advantageously mixed with the gas before entering the reactor. As a result thereof an optimum distribution of hydrocarbon oil over the catalyst particles is obtained when the hydrocarbon oil is contacted with the catalyst particles in the reactor. Thus an excellent performance of a catalytic cracking unit can be established.

DESCRIPTION OF THE INVENTION

Figure 1:
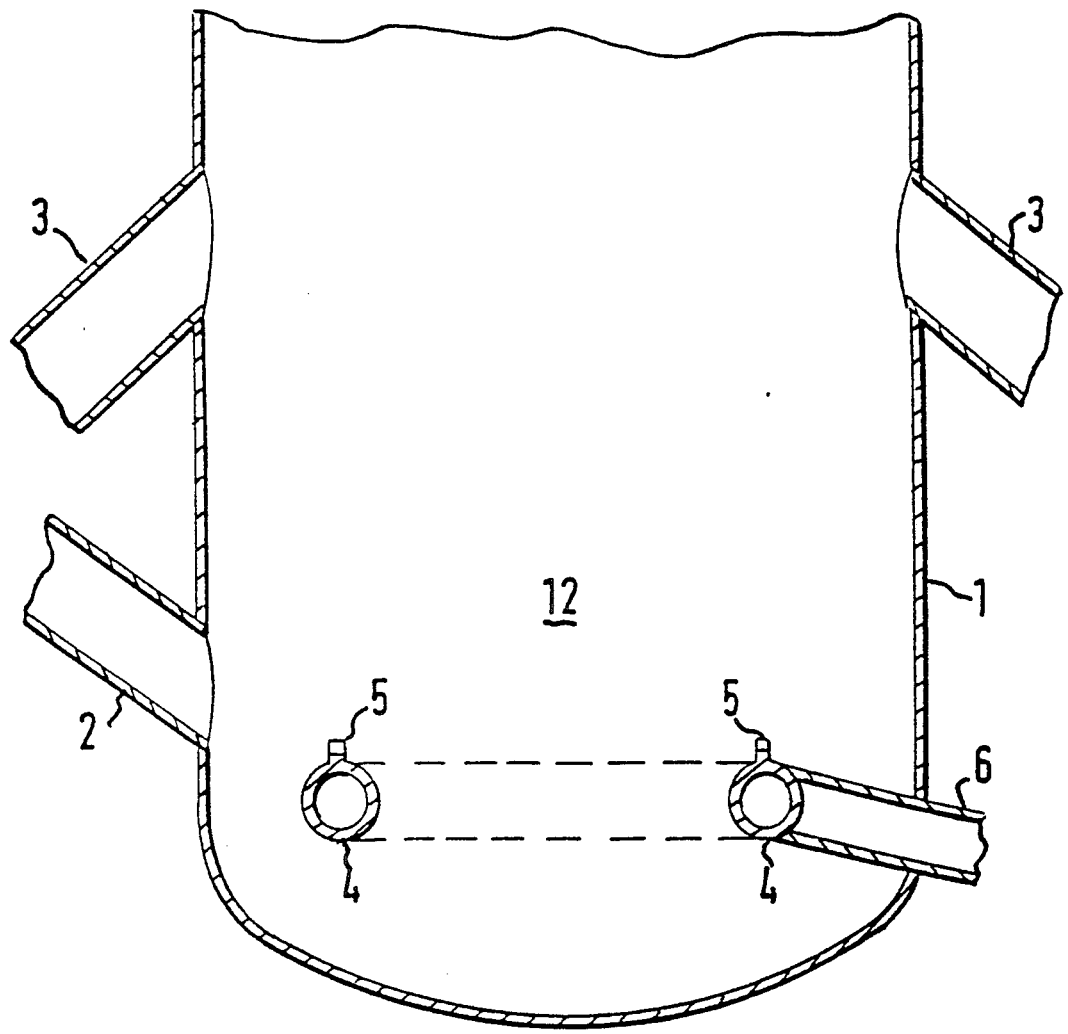
In FIG. 1 a longitudinal section of the bottom part of a fluid catalytic cracking riser reactor is schematically shown which can suitably be used in the process according to the present invention.

It has been found that suitable mixing of the hydrocarbon oil and the gas can be attained if the gas/hydrocarbon oil mixture comprises gas in an amount of 0.1–50 %wt on hydrocarbon oil, preferably 1–15 %wt on hydrocarbon oil.

Preferably, the mixing of the hydrocarbon oil and the gas is carried out in such a way that the gas/hydrocarbon oil flow velocity (m/s) ratio is in the range of 2–30, whereby the gas flow velocity is defined as the the velocity of the gas calculated in the openings in the wall of the supply means. Preferably, the gas/hydrocarbon oil flow ratio is in the range of 5–15.

The process according to the present invention is preferably carried out in such a way that the pressure of the gas entering the supply means is in the range of 2–15 bar, preferably in the range of 5–10 bar. Suitably, the gas/hydrocarbon oil mixture enters the reactor with a velocity of 20–400 m/s. In the process according to the present invention various gases can be applied. The gases which can suitably be applied in the process according to the present invention comprise for instance the hydrocarbon gases comprising four or less carbon atoms, refinery gases (including $H_2S$), steam and/or any mixture thereof. Preferably, use is made of steam.

Suitably, the present process is carried out using a device for the introduction of the hydrocarbon oil which comprises more than one supply means as described hereinbefore.

In a preferred embodiment of the process according to the present invention the hydrocarbon oil is introduced by means of more than one device as described hereinbefore, for instance by four of these devices.

Suitably, the upstream end of the device for introducing the hydrocarbon oil is located above an inlet means for introducing catalyst particles.

The openings in the supply means of the device to be used in the process according to the present invention are suitably located near the upstream end of of the supply means.

Suitably, the openings are substantially regularly arranged in at least one plane perpendicular to the central longitudinal axis of the supply means. Preferably, an even number of openings is symmetrically arranged in said plane(s). Preferably, at least 4 openings are symmetrically arranged in said plane(s).

Suitably, the device as applied in the process according to the present invention comprises tubular supply means.

The bottom part of a riser reactor comprising the device to be used in the process according to the present invention and suitable embodiments of said device for introducing the hydrocarbon oil into the reactor are described hereinafter, using FIGS. 1–3 in which reference numerals relating to corresponding parts are the same.

The bottom part of the fluid catalytic cracking riser reactor as depicted in FIG. 1 comprises a substantially vertically oriented vessel (1) provided with an inlet means (2) for introducing catalyst particles, and four devices (3) (of which only two have been shown) for introducing hydrocarbon oil into the riser reactor. The riser reactor furthermore preferably comprises fluidization means (4), for instance in the form of a ring-shaped or annular fluidization means, provided with regularly spaced fluidization gas openings (e.g. nozzles (5)) through which a fluidization gas, for instance steam, introduced via fluidization gas inlet means (6) emanates into the bottom section (12) of the reactor.

Figure 2:
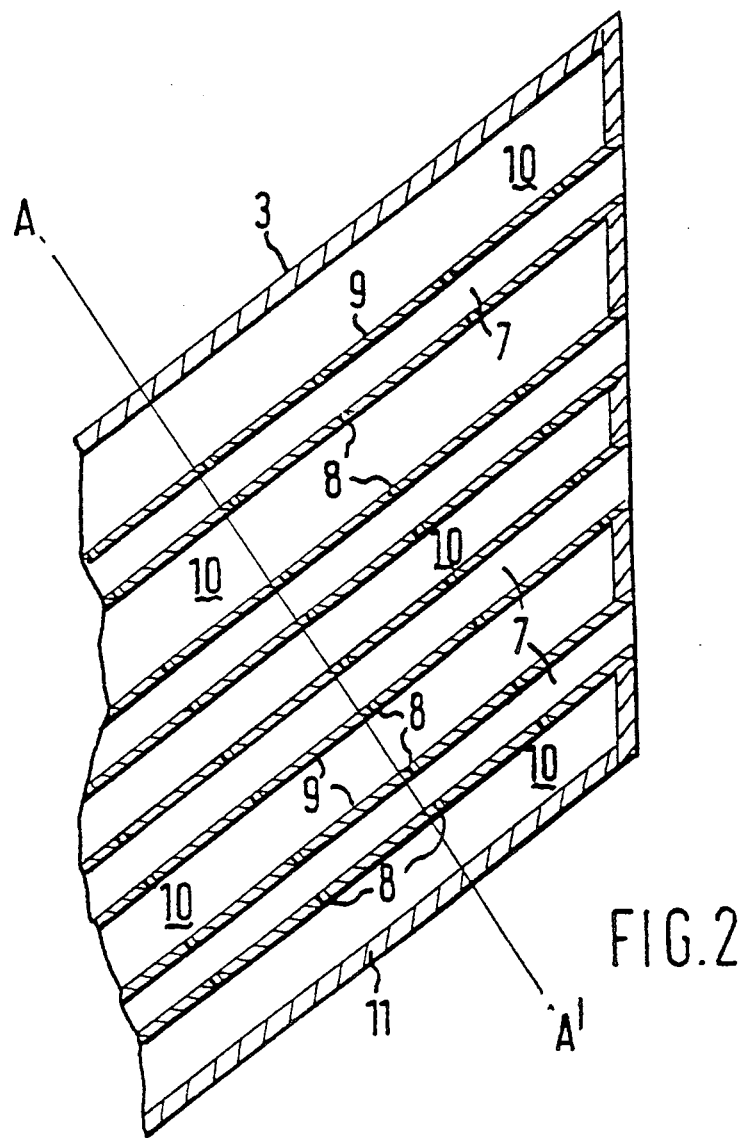
In FIG. 2 a longitudinal section of the upstream end part of the device for introducing the hydrocarbon oil into the reactor as depicted in FIG. 1 is schematically shown in more detail.
Figure 3:
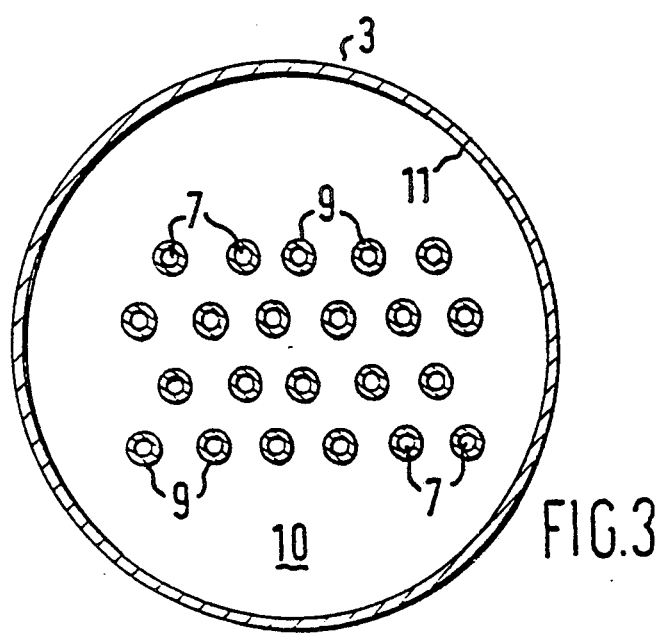
In FIG. 3 a cross-section at AA' of the device as depicted in FIG. 2 is schematically shown.

In FIGS. 2 and 3 the upstream end part of the device (3) for introducing the hydrocarbon oil into the reactor is shown in more detail. The device (3) comprises tubular supply means (7) having openings (8) in their walls (9), and a space (10) arranged between the tubular supply means (7) and wall (11) of the device (3).

The process according to the present invention using the riser reactor of which only the bottom part is shown in FIG. 1 is normally carried out as follows:

A stream of catalyst particles in a carrier gas (e.g. originating from a catalyst regenerator) is introduced through inlet means (2) into the bottom section (12) of the riser reactor. The catalyst particles are fluidized and transported upwardly by means of for instance steam introduced via line (6) into ring-shaped or annular fluidization means (4) provided with regularly spaced fluidization nozzles (5). A stream of a hydrocarbon oil is introduced into supply means (7) of the device (3) and mixed with a stream of steam which enters from space (10) under pressure with a high velocity the supply means (7). The upwardly flowing fluidized mass of catalyst particles is excellently mixed with the mixture of the hydrocarbon oil and steam obtained emanating with a high velocity from device (3).

The use of device (3) in the process according to the present invention results in a very uniform mixing of the fluidized catalyst particles and the hydrocarbon oil. As a result of this uniform mixing a very attractive performance of the catalytic cracking unit can be obtained.

In FIG. 1 the devices (3) are arranged onto the wall of the vessel (1). It will be understood, however, that the device(s) (3) can also suitably be arranged differently, for instance substantially centrally in the bottom section (12) of the riser reactor or at other suitable places, in the riser reactor or stripping zone of a catalytic cracking reactor.

In FIGS. 2 and 3, the tubular supply means (7) are arranged parallel with respect to each other. It will be clear, however, that the supply means (7) can also suitably arranged in a different manner, for instance the supply means (7) may diverge from each other in the direction of the upstream end of the device (3).

The mixing of the gas and the hydrocarbon oil in the supply means (7) is preferably carried out at temperatures in the range of 50°-600° C. more preferably in the range from 100°-400° C.

The process for the catalytic cracking of a hydrocarbon oil according to the present invention is preferably carried out at a temperature from 400°-800° C. and pressures from 1-10 bar. It will be understood that the present process can suitably be carried out using any fluidized catalytic cracking catalyst, however, zeolite-containing catalysts are preferred.

The hydrocarbon oil which can suitably be converted in the process according to the present invention comprises heavy hydrocarbon oils, for instance atmospheric or vacuum distillates, cycle oils and slurry oils, deasphalted oils, atmospheric and vacuum residues, thermally cracked residues, asphalts originating from various kinds of deasphalting processes, synthetic residues and hydrocarbon oils originating from hydroconversion processes, tar sands and shale oils of any source, and/or any mixture thereof.

The ranges and limitations provided in the instant specification and claims are those which are believed to particularly point out and distinctly claim the instant invention. It is, however, understood that other ranges and limitations that perform substantially the same function in substantially the same way to obtain substantially the same results are intended to be within the scope of the instant invention as defined by the instant specification and claims.

EXAMPLE

The invention will be described by the following example which is provided for illustrative purposes and is not to be construed as limiting the invention:

A feed stream of a straight run heavy hydrocarbon oil (a Conradson carbon content of about 5 %wt) enters supply means (7) of the riser reactor as partly depicted in FIG. 1 at a temperature of 260° C. and is mixed in the supply means (7) with a stream of steam, which enters space (10) at a temperature of 260° C. and a pressure of 6 bar. The resulting oil/steam mixture flows with a velocity of more than 70 m/s through the upstream end of supply means (7) into the reactor vessel (1), which is operated at a pressure of 3 bar and a temperature of 520° C. Regenerated zeolite Y based catalyst particles are introduced via inlet (2) at a temperature of 705° C. into the reactor vessel (1) wherein the catalyst particles are contacted with the oil/steam mixture.

The product yields on feed obtained in the above Example are summarized in the Table as shown hereinbelow.

TABLE

| Product Yields | | |
|---|---|---|
| $C_1$-$C_4$ | % wt | 17.8 |
| $C_5$-221° C. | % wt | 51.0 |
| 221-370° C. | % wt | 17.0 |
| 370° C.+ | % wt | 7.2 |
| coke | % wt | 7.0 |

It will be clear from the results presented in the Table shown hereinabove, indicating an attractive yield of products in the gasoline range, that a heavy hydrocarbon oil can very suitably be subjected to the process according to the present invention.

What is claimed is:

1. A device for introducing a hydrocarbon into a riser reactor comprising a tubular diluent gas conduit having an interior wall surface and an exterior wall surface wherein said interior wall surface is for passing a diluent gas into a riser reactor and two or more tubular hydrocarbon supply conduits, longitudinally perforated, arranged within the tubular diluent gas conduit wherein said longitudinal perforations are adapted to pass the diluent gas from the tubular diluent gas conduit into the tubular hydrocarbon supply conduit.

2. The device according to claim 1 wherein each one of the tubular hydrocarbon supply conduits has an upstream end and a downstream end and wherein the longitudinal perforations are located near the upstream end.

3. The device according to claim 1 wherein the longitudinal perforations are substantially symmetrically arranged in at least one plane perpendicular to the central longitudinal axis of the hydrocarbon supply conduits.

4. The device according to claim 1 wherein an even number of perforations are symmetrically arranged in the plane perpendicular to the central longitudinal axis of the hydrocarbon supply conduits.

* * * * *